United States Patent [19]

Friedman et al.

[11] 4,174,164
[45] Nov. 13, 1979

[54] PHOTOGRAPHIC PROCESSING APPARATUS

[75] Inventors: Harvey S. Friedman, Sudbury; Irving S. Lippert, Lexington, both of Mass.

[73] Assignee: Polaroid Corporation, Cambridge, Mass.

[21] Appl. No.: 910,736

[22] Filed: May 30, 1978

[51] Int. Cl.$^2$ ............................................. G03B 17/50
[52] U.S. Cl. ........................................................ 354/86
[58] Field of Search ..................................... 354/83–86, 354/303, 304

[56] References Cited

U.S. PATENT DOCUMENTS

| | | | |
|---|---|---|---|
| 3,647,441 | 3/1972 | Bachelder | 96/29 |
| 3,776,118 | 12/1973 | Driscoll et al. | 354/86 |
| 3,810,211 | 5/1974 | Wareham et al. | 354/86 |
| 3,854,809 | 12/1974 | Driscoll | 354/86 |
| 3,882,518 | 5/1975 | Douglas | 354/86 X |
| 3,994,002 | 11/1976 | Ivester | 354/86 |
| 4,005,446 | 1/1977 | Friedman | 354/86 |
| 4,016,578 | 4/1977 | Friedman | 354/86 |
| 4,020,498 | 4/1977 | Friedman | 354/86 |

FOREIGN PATENT DOCUMENTS 1486846  9/1977  United Kingdom ..................... 354/86

Primary Examiner—Donald A. Griffin
Attorney, Agent, or Firm—Francis J. Caufield

[57] ABSTRACT

In a photographic apparatus of the type which includes a pair of motor driven cylindrical processing rollers and a film advancing mechanism for consecutively transporting and processing a stacked array of flexible, integral type self-processable film units, an improved roller mounting arrangement is provided by which the cylindrical processing rollers are mounted with their axes of rotation crossed in a predetermined manner to operate in conjunction with a post-roller film deflecting plate to assure that the film unit's processing fluid is distributed over preselected portions of the film unit in a substantially uniform thin layer, the improvement operating to correct inherent nonuniformities in the thickness of the processing fluid layer which would occur if the rollers were not cross-mounted and the deflecting plate were not present.

8 Claims, 8 Drawing Figures

PHOTOGRAPHIC PROCESSING APPARATUS

BACKGROUND OF THE INVENTION

1. Field of the Invention

The present invention generally relates to the field of photography and, more specifically, to photographic processing apparatus by which the thickness of a layer of processing fluid is controlled in a uniform manner as the processing fluid is spread across preselected portions of an integral type self-processable film unit.

2. Description of the Prior Art

In the processing of self-processable type film units, an important and well-known step by which a latent image is transformed into a visible one involves spreading a viscous processing fluid containing chemical agents between preselected layers of the film unit and substantially coextensive with the photoexposed area to initiate a diffusion transfer development process which provides a visible transfer image. To assure that the resultant visible image from the diffusion transfer process meets high standards of photographic quality and that each part of the latent image receives equal treatment, it is necessary that the thickness of the processing fluid layer over the film units photoexposed area be substantially uniform and at least meet a minimum thickness requirement.

The primary concern of the present invention is with the structure and function of a photographic processing apparatus which can be used with integral type self-processable film units to compensate for certain fluid spreading phenomena which would otherwise result in a nonuniformly thick fluid layer or, under extreme temperature conditions, an incompletely covered photoexposed area.

The integral type film units with which the present invention is most useful contain all the photographic components necessary for the diffusion transfer process and are described in considerable detail, for example, in U.S. Pat. Nos. 3,415,644; 3,594,165; and 3,761,268. Typically, these film units comprise, in general terms, a pair of superposed sheet elements, at least one being transparent, which serve to support layers of chemical substances which usually comprise photosensitive and image-receiving layers; and, as well, include a rupturable container of the viscous processing fluid positioned adjacent a leading edge of the film unit and adapted to have its fluid contents spread between the sheet elements to initiate the diffusion transfer process. The sheet elements and the rupturable container are typically held together by a binding element which is wrapped around their lateral edges and also functions to provide a mask which defines the area of the photosensitive layer which can be photoexposed. Exposure of the film unit's photosensitive layer is generally done through the film unit's transparent sheet, and it is also through the transparent sheet that the visible transfer image is viewed after the diffusion transfer process is complete.

Such film units are usually used with fully automatic cameras which expose them in a well-known manner and afterwards advance them from their exposure location into engagement with a processing apparatus. The processing apparatus which forms an integral part of the camera then continues the advancement of the film unit toward the outside of the camera and during advancement applies a pressure lengthwise of the film unit. The pressure during this operation first ruptures the container of processing fluid causing its fluid contents to be released as a generally elongated mass extending widthwise of the film unit's exposed area and adjacent the film unit's leading edge and then causes the released mass of processing fluid to flow between the sheet elements, opposite to the direction of advancement of the film unit through the processing apparatus, so that the widthwise distributed mass of processing fluid is progressively deposited in a layer lengthwise of the film unit's exposed area.

It is during this fluid spreading step of the diffusion transfer process that certain complex fluid flow phenomena occur which tend to cause the thickness of the layer of processing fluid to be nonuniform over the film unit's exposed area. In general, the phenomena which tend to cause the fluid to spread so that its thickness is nonuniform are related to the mechanical structure and properties of the film unit, interactions between the film unit and the processing apparatus during the fluid spreading phase, and the manner in which the film unit is advanced into engagement with the processing apparatus.

For example, the manner in which the film unit's components are bound together has been found to influence uniformity. In particular, because the sheet elements are tightly bound along their lateral edges, it has been found that there is generally more lengthwise resistance to fluid flow along these edges than there is to fluid which flows lengthwise along the center of the film unit's exposure area. As a consequence, the thickness of the fluid layer over the central regions of the exposure area tends to be generally greater than that over the exposure area's lateral regions.

The prior art discloses processing apparatus for correcting this tendency toward a centrally thickened layer of processing fluid over the film unit's exposure area. More particularly, U.S. Pat. No. 3,776,118 issued to John J. Driscoll et al on Dec. 4, 1973 and entitled "Photographic Film Processing Apparatus" discloses a processing apparatus comprising a pair of processing rollers one of which is crowned to provide it with a predetermined convex profile configuration by which the thickness of the layer of processing fluid over central regions of the film unit's exposure area is thinned out.

Also the tendency for thicker processing fluid layers at the center of the exposure area can be aggravated if the processing apparatus has rollers which bend during the fluid spreading step. This usually happens when the rollers are intentionally made light weight to reduce their inertia so that less power is required to drive them in the case where they are automatically driven by a motor and gear train arrangement. The crowned roller is therefore of use to compensate for any roller bending which may occur as a result of the pressures they experience during fluid spreading.

Although the "crowned" roller represents a solution to the nonuniformity problem outlined above, it suffers from the disadvantage of being relatively expensive to manufacture. A less expensive alternative to the "crowned" roller, which is disclosed in Great Britain patent specification No. 1,486,846 published on Sept. 28, 1977 in the name of Fuji Photo Film Co., Ltd. and entitled "Film Unit Processing Means," comprises a processing apparatus having a pair of juxtaposed rollers mounted so that their axes of rotation are crossed to provide an effect similar to that achieved with the "crowned" roller.

In addition to the foregoing solutions to this particular nonuniformity problem, it has also been found that deflecting the film unit out of its normal path of travel after it emerges from between the processing rollers can have a beneficial influence on uniformity. Processing apparatus by which deflection can be achieved is respectively taught and disclosed in U.S. Pat. No. 3,810,211 issued to Richard R. Wareham et al on May 7, 1974 and entitled "Self-Developing Camera System" and U.S. Pat. No. 3,994,002 issued to Andrew S. Ivester on Nov. 23, 1976 and entitled "Self-Developing Camera With Film Unit Deflecting Structure."

Another source of nonuniformity in the thickness of the fluid layer comes about when the film unit is advanced in a canted manner into engagement with the processing apparatus. Unlike the previous nonuniformity problem, however, this particular one is more localized in that it manifests itself as an incomplete coverage problem at one corner of the film unit's trailing edge.

To be more specific, the fully automatic cameras with which these film units are used are generally provided with a film advancing mechanism to automatically move the film units from their exposure position into engagement with the processing apparatus. The film advance mechanisms, which are well-known, usually have a "pick" arm which engages only one side of the film unit's trailing edge to provide a force which moves the film unit toward the processing apparatus (see, e.g., U.S. Pat. No. 3,709,122). Because the "pick" applies its force in an asymmetric fashion, the film unit moves toward the processing apparatus with its leading edge canted at a predetermined angle with respect to its general direction of travel. It has been observed that the film unit is maintained in this canted attitude as it travels through the rollers of the processing apparatus. With these one-sided "picking" arrangements, there is a tendency for the corners of the exposure area adjacent the pick side of the film unit's trailing edge to be incompletely covered by processing fluid as required, particularly at depressed operating temperatures where the viscosity of the processing fluid is higher.

One explanation for this incomplete corner coverage problem is that the canting may give rise to a lateral (widthwise) force component that causes the processing fluid to flow to the non-pick side of the exposure area. Based on this explanation, the prior art provided a solution in the form of a processing roller having a reduced end diameter on the "pick" side to obviate this tendency. The reduced end diameter causes a reduction in the thickness of the processing fluid in regions adjacent the "pick" side so that the coverage capability of the fluid is extended in those regions to eliminate the tendency for the "pick" side to be incompletely covered with processing fluid (see U.S. Pat. No. 3,854,809 issued to John J. Driscoll, Dec. 17, 1974 and entitled "Photographic Apparatus").

Another explanation for this tendency is discussed in U.S. Pat. No. 4,020,498 issued to Harvey S. Friedman on Apr. 26, 1977 and entitled "Photographic Fluid Processing Apparatus." Here, it is reasoned that the incomplete corner coverage problem comes about as a result of the detailed interactions which take place between a pair of spaced apart annular grooves, located in one of the rollers, and the longitudinally bound margins of the film unit as the canted film unit is advanced lengthwise through the rollers. Because the film unit is canted, its interaction with the annular grooves is also asymmetric, a condition not intended. This condition causes the fluid which is available for the regions of the exposure area adjacent the "pick" side to be deposited at a faster rate than intended thereby causing a deficit to exist when the "pick-side" corner is ready to be covered. The Friedman patent provides a solution by positioning the annular grooves located on one of its rollers in an asymmetric manner to compensate for the canted attitude of the advancing film unit.

The prior art also discloses in U.S. Pat. No. 4,016,578 issued to Harvey S. Friedman on Apr. 5, 1977 and entitled "Processing Fluid Flow Control Device For Self-Developing Camera" a processing apparatus having a specially contoured camming surface for intercepting a film unit as it emerges from a pair of processing rollers to provide the film unit with a complex curvature which influences the thickness distribution of the layer of processing fluid—particularly along both sides of the exposure area.

Because processing apparatus of the foregoing type, found in the prior art, represent a significant part of the cost of the cameras in which they are used, it is a primary object of the present invention to provide a less expensive processing apparatus for use in automatic cameras which utilize one-sided film advance arrangements and the foregoing type integral type self-processable film units and by which both types of fluid thickness nonuniformities discussed above can be eliminated.

Other objects of the invention will in part be obvious and will in part appear hereinafter. The invention accordingly comprises the apparatus possessing the construction, combination of elements, and arrangement of parts which are exemplified in the following detailed disclosure.

SUMMARY OF THE INVENTION

This invention relates to photographic processing apparatus for use with self-processable film units of the type which include a pair of resiliently flexible, substantially flat, rectangular, superposed sheet elements and a rupturable container of processing fluid positioned adjacent a leading edge of the film unit and adapted to have its fluid contents spread between the sheet elements in a substantially uniform thin layer which covers an exposure area of given length and width.

The apparatus comprises a pair of elongated cylindrical processing rollers of given width and includes means for mounting the processing rollers in juxtaposed relationship to define an elongated pressure generating gap through which a film unit may be advanced to apply a pressure to the film unit to first rupture the container of processing fluid causing its fluid contents to be released as a generally elongated mass extending widthwise of the film unit's exposure area and adjacent the leading edge of the film unit and then to cause the released mass of processing fluid to flow between the sheet elements opposite to the direction of advancement of the film unit through the gap so that the widthwise distributed mass of processing fluid is progressively deposited in a layer lengthwise of the film unit's exposure area. Means are included for mounting the processing rollers with their axes of rotation lying in parallel spaced apart planes and intersecting one another when either roller axis is projected onto the other roller's mounting plane. Mounted in this manner, the rollers present to a film unit an effective gap, different from the geometric gap separating them, which varies across the width of the rollers. The effective gap operates, as the fluid mass is spread lengthwise over the exposure area, to reduce the thickness of the fluid widthwise of the film unit's exposure area in such a way that the widthwise thickness of the fluid over central regions of the exposure area is reduced relative to the fluid layer's thickness over lateral regions of the exposure area compared to what such central region's fluid thickness would otherwise be if the roller's axes did not intersect. The rollers further operate to induce a widthwise twist in a film unit after it emerges from the gap so that one side of the film unit is displaced away from the attitude that it would normally assume if the roller's axes did not intersect and the other side of the film unit is displaced away from the attitude it would normally assume, and opposite to the displacement of that of the one side, if the roller's axes did not intersect.

Additionally provided are interceptor means positioned along the path of travel a film unit takes after it emerges from the gap and structured for engaging one side of the film unit as the film unit is advanced lengthwise past the interceptor means to bend this one side in a direction opposite to the direction in which it is twisted by the rollers. The interceptor means structured in this manner operate to reduce the thickness of the fluid layer widthwise over regions of the exposure area of the film unit corresponding to the one side engaged by the interceptor means compared to what the fluid layer thickness in such regions would be absent the interceptor means.

The rollers in combination with the interceptor means cooperate in the foregoing manner to provide a layer of fluid whose thickness, both widthwise and lengthwise of the film unit's exposure area, is substantially constant.

DESCRIPTION OF THE DRAWINGS

The novel features that are considered characteristic of the invention are set forth with particularity in the appended claims. The invention itself, however, both as to its organization and method of operation together with other objects and advantages thereof will best be understood from the following description of the illustrated embodiment when read in connection with the accompanying drawings wherein like numbers have been employed in the different figures to denote the same parts and wherein:

DESCRIPTION OF THE PREFERRED EMBODIMENT

Figure 1:
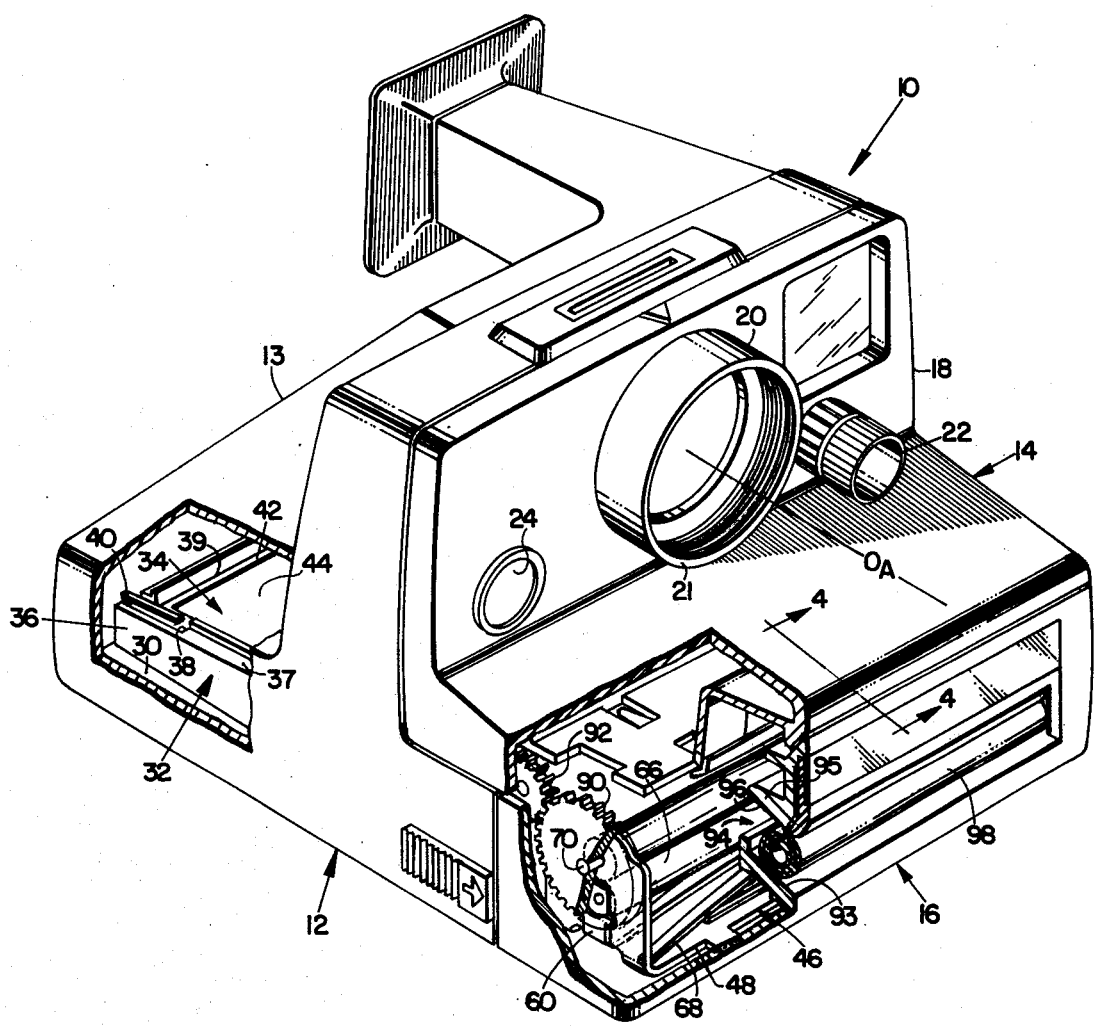
FIG. 1 is a perspective view, with parts broken away, of a self-processable type camera embodying the film processing apparatus of the present invention.

Referring now to FIG. 1, there is shown a fully automatic camera 10 of the type which uses integral type, self-processable film units and in which the photographic processing apparatus of the present invention may be incorporated.

The camera 10 comprises a body 12, a front cover 14, and a door 16 which interconnect to define its outward appearance and serve as a protective enclosure for housing the camera's interior components.

Located in a vertical forward wall 18 of the front cover 14 is an objective taking lens 20 having an optical axis, OA, therethrough. The objective taking lens 20 may be a Cooke Triplet or similar multi-element type of lens which can have its focal length changed by adjusting the axial air spacing between its optical elements. This may be accomplished in a well-known manner by rotating a bezel, such as that designated at 21, which extends through an opening in the front cover 14 and is coupled with a screw-threaded lens mount (not shown).

Formed in the base of the body 12 is a well-known film cassette receiving chamber 30 which is adapted to releasably hold a film cassssette such as that designated at 32. The cassette 32 comprises a generally rectangular parallelepiped housing 36 which has an upwardly facing wall 37 having a generally rectangular aperture 39 therein. Mounted in registration with and biased toward the aperture 39 is a stacked array of integral type self-processable film units generally designated at 34. Underneath the stacked array of film units 34 is a flat, thin battery (not shown) which may be used to supply power to the various electrical components of the camera 10.

In the foregoing manner, the camera 10 is provided with means for facilitating the locating of a stacked array of film units with an uppermost one of the stacked array in position for photoexposure.

Figure 3:
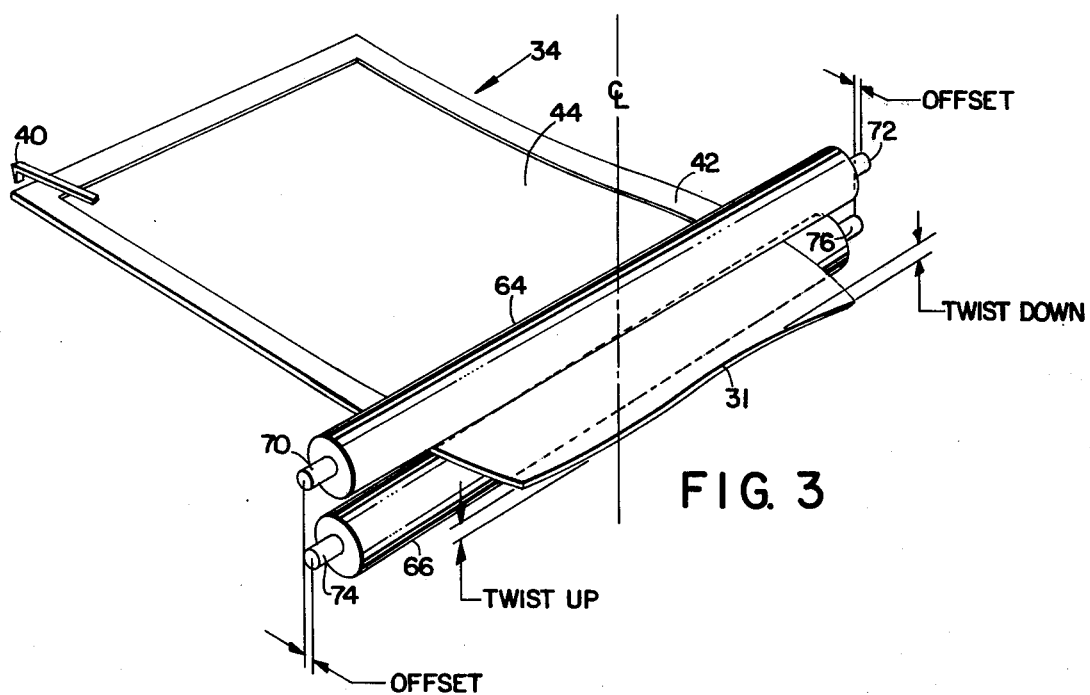
FIG. 3 is a diagrammatic perspective view of a part of the film processing apparatus of this invention shown in combination with a film unit.
Figure 8:
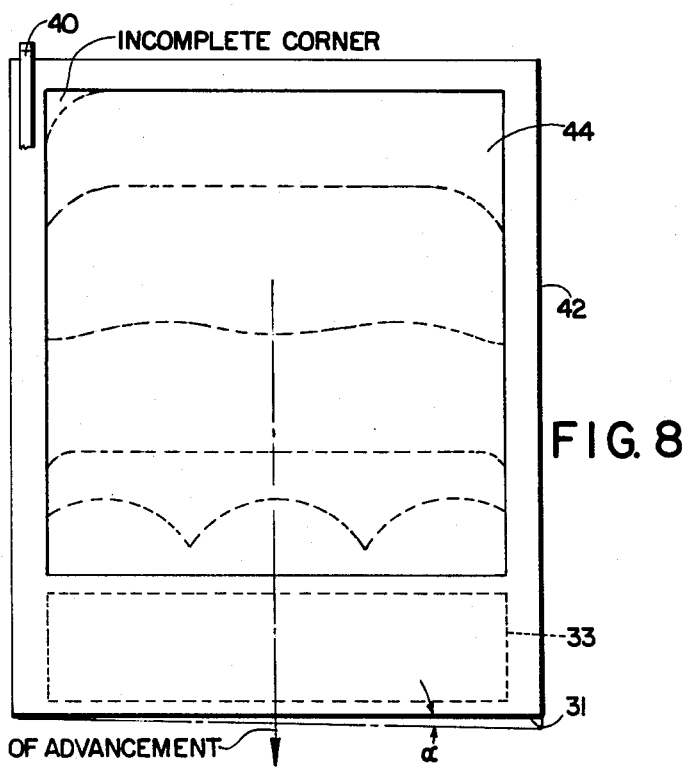
FIG. 8 is a diagrammatic plan view which illustrates an incomplete corner coverage problem by showing in dotted lines the progressive advancement of a fluid wave front across the photoexposed area of a film unit.

Referring now to FIGS. 1, 3 and 8, it can be seen that each film unit 34 comprises a pair of superposed sheet elements including a top transparent sheet 44, preferably formed of Mylar, beneath which is a bottom sheet that is not shown. Positoned adjacent a leading edge 31 of the film unit's sheet elements is a rupturable container 33 of viscous processing fluid or composition (not shown) adapted to have its contents spread between the film unit's sheet elements to effect a diffusion transfer process after the film unit is photoexposed.

Each film unit's sheet elements and the rupturable container 33 are bound together by a binding element 42 which overlaps their lateral edges and has portions adhered to their outwardly facing surfaces. The peripheral edges of the binding element 42 which terminate on the outer surfaces of the transparent sheet 44 are generally coextensive with the aperture 39 of the film cassette 32 and as such define the area of each film unit 34 which may be exposed through the top transparent sheet 44. Also the longitudinal edges of the film unit's sheet elements which are bound by the element 42 operate in a well-known manner to at least in part define the thickness of the layer of processing fluid which can be spread between the film unit's sheet elements.

An example of such a film cassette 32 is described in considerable detail in U.S. Pat. No. 3,872,487 issued to Nicholas Gold on Mar. 18, 1975 and entitled "Photographic Film Assemblage and Apparatus" and of such film units 34 in previously mentioned U.S. Pat. Nos. 3,415,644; 3,594,165; and 3,761,268.

The body 12 also includes a generally planar rear wall 13 slanted at a predetermined angle with respect to both the film cassette 32 and the optical axis, OA, of the objective taking lens 20. Attached to the interior of the rear wall 13, but not shown, is a trapezoidal-shaped mirror positioned along the optical axis, OA, intersecting it at a predetermined angle, to provide a folded optical path between the objective taking lens 20 and an uppermost one of the stacked array of film units 34. With this optical arrangement, rays from a scene which emerge from the objective taking lens 20 are reflected from the mirror toward the film units 34.

Exposure of the film units 34 is regulated automatically by a well-known exposure control system which is located, but not shown, behind the front cover's vertical forward wall 18.

Located to the right of the objective taking lens 20 is an optical system 22 which is used to direct scene light to a photodetector (not shown) which forms part of the camera's exposure control system.

To the left of the objective taking lens 20 is a camera start button 24 which, when actuated, initiates, in a well-known manner, a camera operating cycle.

Once a camera operating cycle is initiated, photoexposure of an uppermost one of the film units 34 is effected in the manner previously outlined. The photoexposed film unit is then advanced toward the forward end of the camera 10 where it is brought into engagement with the film processing apparatus of the invention which includes a roller assembly 46 (FIGS. 1 and 2) and parts of the door 16 which will hereinafter be described.

Advancement of a photoexposed film unit 34 is accomplished via a pick member 40 which fits a slot 38 of the film cassette housing 36 and engages a portion of the film unit's trailing edge. The pick member 40 is actuated by a well-known film advancing apparatus to which it is attached to move a predetermined distance toward the roller assembly 46 while pushing a photoexposed film unit 34 along with it.

Such a film advancing arrangement is described in considerable detail in, for example, U.S. Pat. No. 4,047,192 issued to Bruce K. Johnson et al on Sept. 6, 1977 and entitled "Photographic Apparatus With Sequencing System."

In the foregoing manner, the camera 10 is provided with means for advancing an uppermost film unit from its exposure position and toward the roller assembly 46. The film advancing means includes means by which a film unit is engaged on one side of its trailing edge so that the film unit thus engaged is advanced toward the roller assembly 46 with its leading edge 31 canted at a predetermined angle, $\alpha$, with respect to its general direction of advancement (see FIG. 8).

The roller assembly 46 is mounted in a well-known manner on the door 16 to pivot downwardly thereby providing access to the film cassette receiving chamber 30 so that the film cassette 32 can be loaded or removed therefrom. As an example of this arrangement, reference may be had to U.S. Pat. No. 3,974,510 issued to Andrew S. Ivester on Aug. 10, 1976 and entitled "Mounting Apparatus For A Spreader Roller Assembly."

Figure 2:
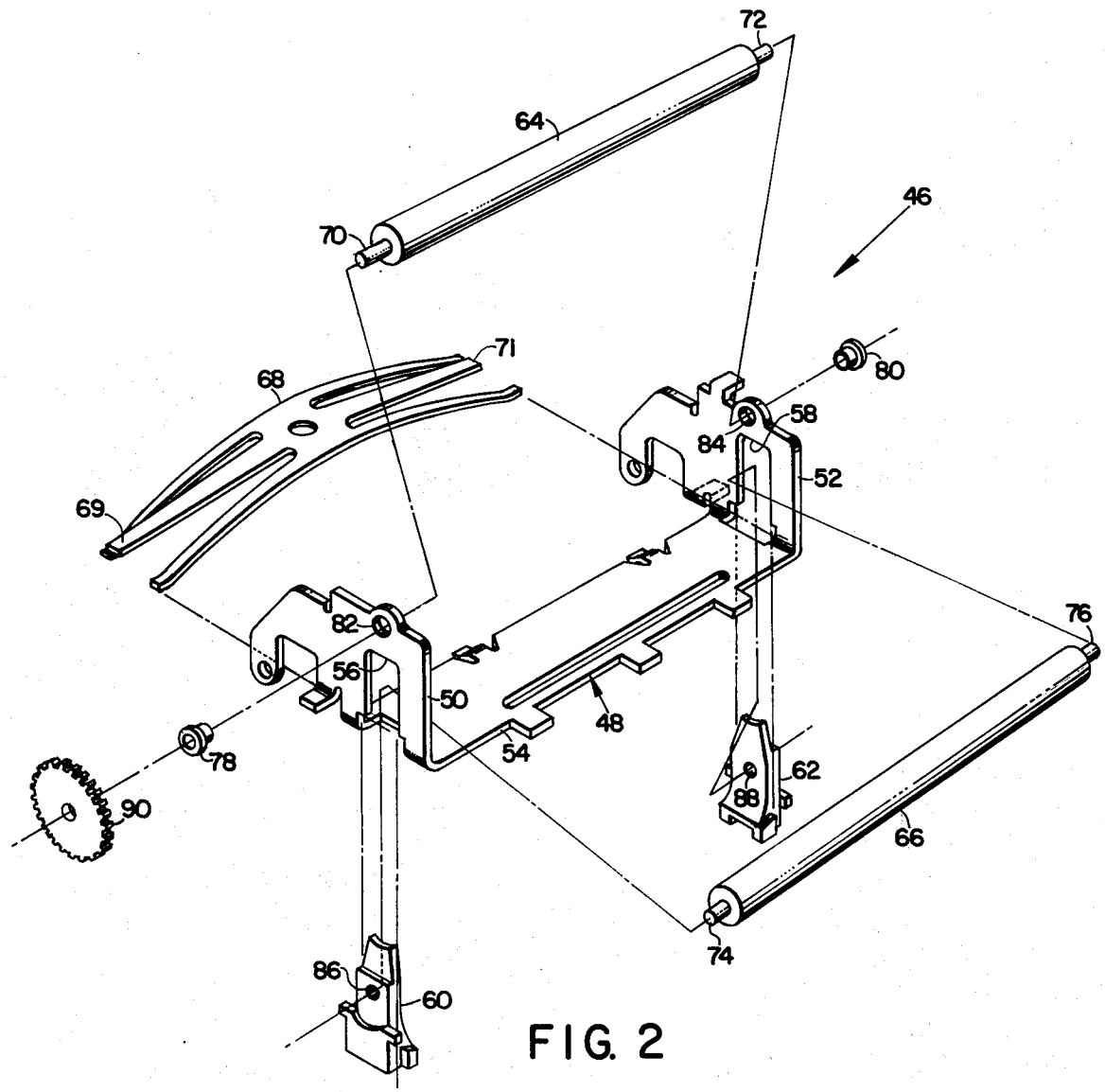
FIG. 2 is an exploded perspective view of part of the film processing apparatus of this invention.

As best shown in FIGS. 1 and 2, the roller assembly 46 comprises a "U"-shaped support bracket 48 which includes a base section 54 having two spaced apart vertical legs, 50 and 52, depending upwardly therefrom. Formed in the uppermost portion of each vertical leg, 50 and 52, are spaced apart holes, 82 and 84 respectively, each of which is adapted to receive bearings, 78 and 80 respectively. Rotatably mounted in the bearings, 78 and 80, are the journals, 70 and 72 respectively, of a topmost cylindrical processing roller 64.

Also formed in the vertical legs, 50 and 52, are vertically oriented slots, 56 and 58 respectively. Slidably disposed in each vertical slot, 56 and 58, are complementary configured bearing blocks, 60 and 62 respectively, each of which includes bearing holes, 86 and 88 respectively. A bottommost cylindrical processing roller 66 is mounted for rotation in the bearing block holes, 86 and 88, via a pair of spaced apart journals, 74 and 76 respectively. The bottom roller thus arranged can rotate with respect to the bearing blocks, 60 and 62, while the bearing blocks, 60 and 62, can slide up or down in their respective slots, 56 and 58.

Opposed end portions, 69 and 71, of a bow-shaped spring 68 engage, respectively, bottom portions of the bearing blocks, 60 and 62, to resiliently and continuously urge the roller 66 upwardly toward the uppermost roller 64.

As diagrammatically shown in FIG. 3, the journal 74 of the bottom roller 66 on the "pick" side of the camera 10, i.e., the side where the pick 40 is located, is offset a predetermined distance toward the front of the camera 10 with respect to the journal 70 of the uppermost roller 64 while the reverse is true for both of the roller's journals on the "non-pick" side of the camera 10. This is readily accomplished by offsetting the bearing holes 86 and 88 into which the bottom roller's journals, 74 and 76, respectively mount. The forward offset of the bottom roller's "pick" side journal 74 and the rearward offset of its non-pick side journal 76 are made equal so that the axes of rotation of the rollers, 64 and 66, intersect at the midpoints of the rollers when either roller axis of rotation is projected onto the other's mounting plane (see FIGS. 6 and 7).

Rotatably mounted in this manner, the rollers, 64 and 66, are "crossed" or "cross-mounted" and define between them an elongated pressure generating gap through which a film unit 34 can be advanced by rotating at least one of the rollers in a manner to be described.

The pressure generating gap thus formed between the rollers, 64 and 66, is also positioned to engagably receive the leading edge 31 of an uppermost film unit 34 as it is forwardly advanced by the pick member 40 after the film unit has been photoexposed and operates, in general terms, to first rupture the container 33 of processing fluid causing its fluid contents to be released as a generally elongated mass extending widthwise of the film unit's exposure area (FIG. 8) and then to cause the released mass of processing fluid to flow between the film unit's sheet elements opposite to the direction of advancement of the film unit through the gap so that the widthwise distributed mass of processing fluid is progressively deposited in a layer lengthwise of the film unit's exposure area.

Figure 6:
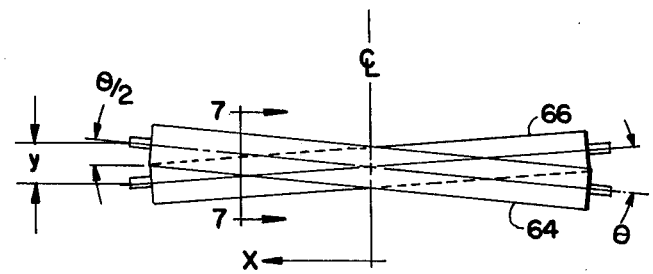
FIG. 6 is a diagrammatic plan view of part of the invention shown in FIG. 3.
Figure 7:
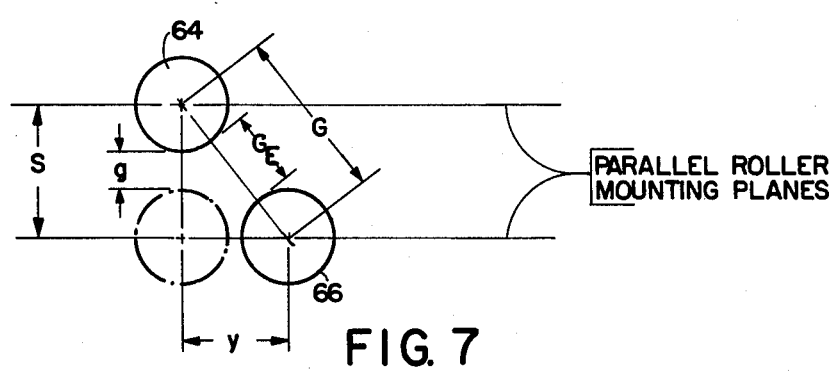
FIG. 7 is a diagrammatic side-elevational sectional view of part of the invention taken generally along line 7—7 of FIG. 6.

As the fluid is being spread lengthwise of the film unit, the "crossed" rollers as best seen diagrammatically in FIGS. 6 and 7 present to it an effective gap, $G_E$, which is different from the geometric gap, g, vertically separating the surfaces of the rollers, 64 and 66, and which varies across the width of the rollers according to the relationship, $G_E = (g^2 + 4x^2 \tan^2\theta/2)^{\frac{1}{2}} - d$ where:

g = vertical gap between the rollers' surfaces;
x = widthwise distance from cross-over point of rollers;
θ = angle formed between the intersecting rollers; and
d = roller diameter.

When the rollers are crossed at their midpoints, as they are in the preferred embodiment, the effective gap, $G_E$, is narrowest at this location and widens towards the roller's ends. The effective gap, $G_E$, operates, as the fluid mass is spread lengthwise over the exposure area, to reduce the thickness of the fluid widthwise of the film unit's exposure area in such a way that the widthwise thickness of the fluid over central regions of the exposure area is reduced relative to the fluid layer's thickness over lateral regions of the exposure area compared to what such central region's fluid thickness would otherwise be if the roller's axes did not intersect. The crossed rollers thus produce an effect which is somewhat similar to that produced when one of the rollers of a processing apparatus such as this is provided with a "crown."

As shown diagrammatically in FIG. 3, the rollers thus mounted also operate to induce a widthwise twist in a film unit after it emerges from the roller gap so that one side of the film unit is displaced away from the attitude that it would normally assume if the roller's axes did not intersect and the other side of the film unit is displaced away from the attitude it would normally assume, and opposite to the displacement of that of said one side, if the roller's axes did not intersect.

Because the bottom roller 66 on the "pick" side of the camera 10 is advanced ahead of the top roller 64 and vice-versa on the camera's "non-pick" side, the film unit is displaced upwardly on the camera's "pick" side and downwardly on the camera's "non-pick" side. The significance of this twist in the film unit and its effect on the thickness of the processing fluid layer will subsequently become apparent.

Fixedly mounted on the journal 70 of the top roller 64 is a gear 90 (FIGS. 1 and 2) which is meshed with a pinion gear 92. The pinion gear 92 is driven by a well-known motor powered gear train (not shown) to cause the rollers 64 and 66 to rotate, via the gearing arrangement outlined, to advance a photoexposed film unit 34 to the exterior of the camera 10 while spreading its self-contained processing fluid in a layer between its sheet elements. Such a gearing arrangement is described in detail, for example, in U.S. Pat. No. 4,051,492 issued to Irving Laskin et al on Sept. 27, 1977 and entitled "Photographic Apparatus Gear Train Having A Unique Set Of Gears."

Figure 4:
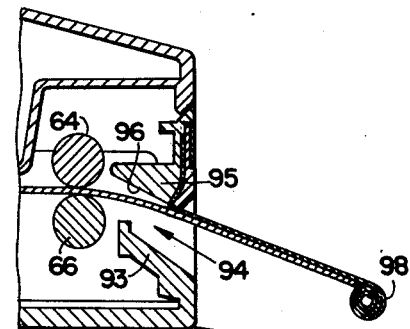
FIG. 4 is a diagrammatic side-elevational sectional view of part of the film processing apparatus of the invention taken generally along line 4—4 of FIG. 1.

Referring now to FIGS. 1 and 4, it can be seen that the door 16 includes an elongated film exit slot 94 which extends transverse to the path of travel of a film unit emerging from the rollers 64 and 66. The exit slot 94 is defined by a rearwardly extending wall section 93 which angles upwardly toward the lower roller 66 and a film camming member 95 having a camming surface 96 which is positioned to intercept a film unit as it emerges from the roller's gap to bend the film unit downwardly so that it travels through the exit slot 94 to the outside of the camera 10 where the photographer can retrieve it.

The camming surface 96 is positioned along the path of travel a film unit would normally assume as it emerges from the roller gap—the normal path being related to the inherent resilient characteristics of the film unit.

The camming surface has an effect on the thickness of the fluid layer which can be described as a change in "effective gap." In other words the thickness of the fluid is controlled, ultimately, not only by the roller's effective gap, $G_E$, but by the combination of the camming surface 96 and the rollers 64 and 66.

In particular, the camming surface 96 operates to simultaneously effect a uniform reduction in the thickness of the processing fluid layer widthwise of the film unit's exposure area and an additional widthwise reduction in the thickness of the processing fluid layer over regions of the film unit's exposure area corresponding to "pick" side of the camera, i.e., corresponding to regions of the film unit which are twisted upwardly by the rollers 64 and 66. The additional reduction in the fluid layer thickness on the "pick" side occurs because the film unit on the "pick" side is bent downwardly by the camming surface 96 more than the "non-pick" side.

Figure 5:
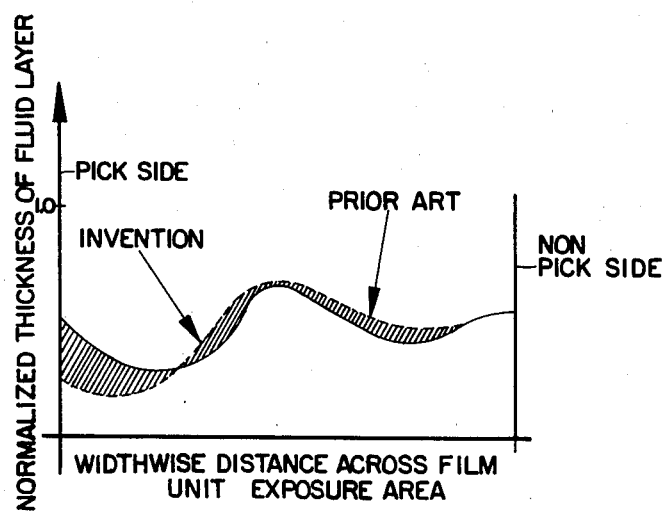
FIG. 5 is a graph which shows the widthwise thickness of a film unit's processing fluid layer for the prior art and the invention.

FIG. 5 contrasts the performance of the invention and that of the prior art by graphically showing how their respective fluid layer thicknesses vary across the width of the film unit's exposure area. The thicknesses shown are normalized and were measured along stations lengthwise of the exposure area in planes normal to the film unit's thinnest dimension and perpendicular to their general direction of advancement through the camera 10. The actual variations in thickness are on the order of ten-thousandths of an inch but are shown on an exaggerated scale to illustrate differences between the invention and the prior art.

As can be seen in FIG. 5, the layer of fluid on the pick side of the film unit widthwise is thinner than that obtained with the prior art device, a "crowned" roller with a reduced end diameter on one of the rollers. Otherwise, the invention gives substantially the same results over other regions of the film unit's exposure area, the difference being represented by the cross-hatched area between the two curves. This indicates that the fluid is spread in a thinner layer on the "pick" side of the film unit's exposure area as the film unit is advanced lengthwise past the camming surface 96.

Thus, the incomplete corner coverage problem which results from a deficit of fluid over the "pick" side trailing edge corner is substantially obviated with the invention because a thinner fluid layer means that the fluid available for spreading over any area can cover a larger area when spread thinner. This is particularly beneficial under depressed operating temperatures where the incomplete corner coverage problem is most likely to occur.

It should also be noted in FIG. 5 that the cross-hatched areas above and below the prior art curve are generally equal. This means that the invention redistributes the total mass of fluid available in such a way that the total mass of fluid in the film unit's container would not have to be changed when using the present invention.

In the foregoing manner, interceptor means have been provided and positioned along the path of travel a film unit takes after it emerges from the roller's gap and structured for engaging one side of a film unit as the film unit is advanced lengthwise past the interceptor means to bend the one side in a direction opposite to the direction in which it is twisted by the rollers, the interceptor means operating to reduce the thickness of the fluid layer widthwise over regions of the exposure area of the film unit corresponding to the one side engaged by the interceptor means compared to what the fluid layer thickness in such regions would be absent said interceptor means. Thus, the "crossed" rollers of the present invention in combination with the camming surface 96 (interceptor means) cooperate in the foregoing manner to provide a layer of fluid whose thickness, both widthwise and lengthwise of the film unit's exposure area is substantially constant.

Certain changes may be made in the above described embodiment without departing from the scope of the invention, and those skilled in the art may make still other changes according to the teachings of the disclosure. Therefore, it is intended that all matter contained in the above description or shown in the accompanying drawings shall be interpreted as illustrative and not in a limiting sense.

What is claimed is:

1. Photographic processing apparatus for use with self-processable film units of the type which include a pair of resiliently flexible, substantially flat, rectangular, superposed sheet elements and a rupturable container of processing fluid positioned adjacent a leading edge of the film unit and adapted to have its fluid contents spread between the sheet elements in a substantially uniform thin layer which covers an exposure area of given length and width, said apparatus comprising:

a pair of elongated cylindrical processing rollers rollers of given width;

means for mounting said processing rollers in juxtaposed relationship to define an elongated pressure generating gap through which a film unit may be advanced to apply a pressure to the film unit to first rupture the container of processing fluid causing its fluid contents to be released as a generally elongated mass extending widthwise of the film unit's exposure area and adjacent the leading edge of the film unit and then to cause the released mass of processing fluid to flow between the sheet elements opposite to the direction of advancement of the film unit through said gap so that the widthwise distributed mass of processing fluid is progressively deposited in a layer lengthwise of the film unit's exposure area, said mounting means being structured so that said processing rollers are mounted with their axes of rotation lying in parallel spaced apart planes and intersect one another when either roller axis is projected onto the other roller's mounting plane so that said rollers present to a film unit an effective gap, different from the geometric gap separating said rollers, which varies across the width of said rollers, said effective gap operating, as the fluid mass is spread lengthwise over the exposure area, to reduce the thickness of the fluid widthwise of the film unit's exposure area in such a way that the widthwise thickness of the fluid over centeral regions of the exposure area is reduced relative to the fluid layer's thickness over lateral regions of the exposure area compared to what such central region's fluid thickness would otherwise be if said roller's axes did not intersect said rollers further operating to induce a widthwise twist in a film unit after it emerges from said gap so that one side of the film unit is displaced away from the attitude that it would normally assume if said roller's axes did not intersect and the other side of the film unit is displaced away from the attitude it would normally assume, and opposite to the displacement of that of said one side, if said roller's axes did not intersect; and interceptor means positioned along the path of travel a film unit takes after it emerges from said gap and structured for engaging said one side of said film unit as the film unit is advanced lengthwise past said intereceptor means to bend said one side in a direction opposite to the direction in which it is twisted by said rollers, said interceptor means operating to reduce the thickness of the fluid layer widthwise over regions of the exposure area of the film unit corresponding to said one side engaged by said interceptor means compared to what the fluid layer thickness in such regions would be absent said interceptor means, said rollers in combination with said interceptor means cooperating in the foregoing manner to provide a layer of fluid whose thickness, both widthwise and lengthwise of the film unit's exposure area, is substantially constant.

2. The apparatus of claim 1 further including means for advancing a film unit so that its leading edge is introduced into said gap, said advancing means including means for engaging a film unit on one side of its trailing edge thereby causing the film unit to be advanced toward said gap with its leading edge canted at a predetermined angle with respect to its general direction of advancement.

3. The apparatus of claim 2 wherein said rollers comprise a top roller and a bottom roller and wherein said mounting means are structured so that the end of said bottom roller which is located on the side of said apparatus on which the trailing edge of a film unit is engaged by said advancing means is advanced ahead of said top roller's corresponding end as measured in the general direction of travel of an advancing film unit.

4. The apparatus of claims 1 or 3 wherein said mounting means are structured so that said rollers' axes of rotation intersect at the midpoint of their given width.

5. The apparatus of claims 1 or 3 wherein said interceptor means is further structured for engaging both sides of a film unit as they advance lengthwise therepast and bending them both alike so that the film unit follows a predetermined curved path of travel which is different from the path it would otherwise follow absent said interceptor means, said interceptor means structured in this manner operating, as the film unit advances lengthwise, to simultaneously effect a uniform reduction in the thickness of the processing fluid layer widthwise of the film unit's exposure area and an additional widthwise reduction in the thickness of the processing fluid layer over regions of the exposure area of the film unit corresponding to that side of the film which is bent most by said interceptor means compared to what the widthwise fluid layer thickness would be absent said interceptor means.

6. The apparatus of claims 1 or 3 further including means for rotatably driving at least one of said rollers to advance a film unit through said gap.

7. Photographic apparatus for use with self-processable film units of the type which includes a pair of resiliently flexible, substantially flat, rectangular, superposed sheet elements and a rupturable container of processing fluid positioned adjacent a leading edge of the film unit and adapted to have its fluid contents spread between the sheet elements in a substantially uniform thin layer which covers an exposure area of given length and width, said apparatus comprising:

means for receiving and facilitating the locating of a stacked array of the film units with the uppermost one of the stacked array in a position for photoexposure;

means for advancing an uppermost film unit, leading edge first, away from said exposure position, said advancing means including means for engaging a film unit on one side of its trailing edge thereby causing the engaged film unit to be advanced away from said exposure position with its leading edge canted at a predetermined angle with respect to its general direction of advancement;

a pair of elongated cylindrical processing rollers including a top roller and a bottom roller of given width;

means for mounting said processing rollers in juxtaposed relationship to define an elongated pressure generating gap positioned to receive the leading edge of an advancing film unit and through which a film unit may be further advanced to apply a pressure to it to first rupture the container of processing fluid causing its fluid contents to be released as a generally elongated mass extending widthwise of the film unit's exposure area and adjacent the leading edge of the film unit and then to cause the released mass of processing fluid to flow between the sheet elements opposite to the direction of advancement of the film unit through said gap so that the widthwise distributed mass of processing fluid is progressively deposited in a layer lengthwise of the film unit's exposure area, said processing rollers being mounted with their axes of rotation lying in parallel spaced apart planes and intersecting one another at their respective widthwise midpoints when either roller's axis is projected onto the other roller's mounting plane, said bottom roller's end which is located on the side of said apparatus on which the trailing edge of a film unit is engaged by said advancing means being advanced ahead of said top roller's corresponding end as measured in the general direction of travel of an advancing film unit, said rollers thus mounted to present to a film unit an effective gap, different from the geometric gap separating said rollers, which varies across the width of said rollers being narrowest at said roller's midpoint and becoming wider towards said roller's ends, said effective gap operating, as the fluid mass is spread lengthwise over the exposure area, to reduce the thickness of the fluid widthwise of the film unit's exposure area in such a way that the widthwise thickness of the fluid over central regions of the exposure area compared to what such central region's fluid thickness would otherwise be if said roller's axes did not intersect, said rollers further operating to induce a widthwise twist in a film unit after it emerges from said gap so that the side of the film unit which is engaged by said advancing means is displaced upwardly from the attitude that it would normally assume if said roller's axes did not intersect and the other side of the film unit is displaced downwardly from the attitude it would normally assume, and opposite to the displacement of that of said one side, if said roller's axes did not intersect;

means for rotatably driving at least one of said rollers to advance an uppermost film unit through said gap; and interceptor means positioned along the path of travel a film unit takes after it emerges from said gap and structured to engage said upwardly displaced side of said film unit as the film unit is advanced lengthwise past said interceptor means to bend said one side opposite to the direction in which it is twisted by said rollers, said interceptor means operating to reduce the thickness of the fluid layer widthwise over regions of the exposure area of the film unit corresponding to said one side engaged by said interceptor means compared to what the fluid layer thickness in such regions would be absent said twist, said rollers in combination with said interceptor means cooperating in the foregoing manner to provide a layer of fluid whose thickness, both widthwise and lengthwise of the film unit's exposure area, is substantially constant.

8. The apparatus of claim 7 wherein said interceptor means is further structured for engaging both sides of a film unit as they advance lengthwise therepast and bending them both alike so that the film unit follows a predetermined curved path of travel which is different from the path it would otherwise follow absent said interceptor means, said interceptor means structured in this manner operating, as the film unit advances lengthwise, to simultaneously effect a uniform reduction in the thickness of the processing fluid layer widthwise of the film unit's exposure area and an additional widthwise reduction in the thickness of the processing fluid layer over regions of the exposure area of the film unit corresponding to that side of the film which is bent most by said interceptor means compared to what the widthwise fluid layer thickness would be absent said interceptor means.

* * * * *